Figure 1:
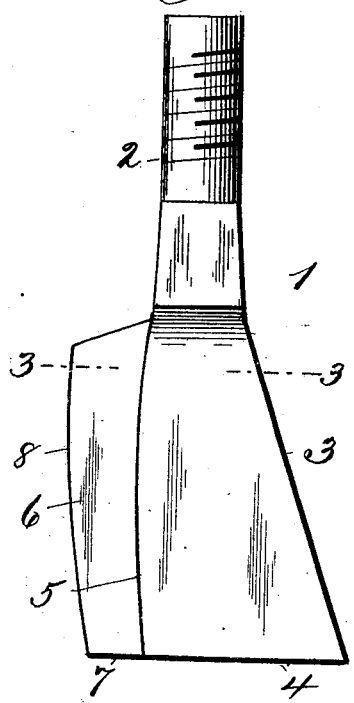

No. 885,433. PATENTED APR. 21, 1908.
F. B. CARLSON.
TOOTH FOR THRESHING MACHINES.
APPLICATION FILED NOV. 11, 1907.

Witnesses
C. M. Butler
C. Northup

Inventor
Fred B. Carlson,
By C. A. Brandenburg
Attorney

THE NORRIS PETERS CO., WASHINGTON, D. C.

UNITED STATES PATENT OFFICE.

FRED B. CARLSON, OF HOLDREGE, NEBRASKA.

TOOTH FOR THRESHING-MACHINES.

No. 885,433.　　Specification of Letters Patent.　　Patented April 21, 1908.

Application filed November 11, 1907. Serial No. 401,647.

*To all whom it may concern:*

Be it known that I, FRED B. CARLSON, citizen of the United States, residing at Holdrede, in the county of Phelps and State of Nebraska, have invented certain new and useful Improvements in Teeth for Threshing-Machines, of which the following is a specification.

My invention relates to teeth for the cylinders and concaves of threshing machines.

Among the objects in view is to provide a threshing tooth which will be durable and which will not, in the act of threshing, take the grain through in bunches, but which at the same time will efficiently and thoroughly thresh the kernels from the stalks and with the above objects in view, the invention consists in the novel construction of the tooth as hereinafter fully described, illustrated in the drawing and pointed out in the appended claim.

Figure 2:
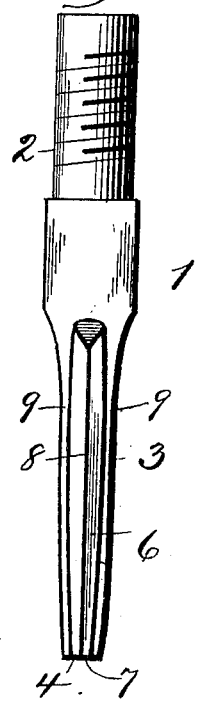
Figure 3:
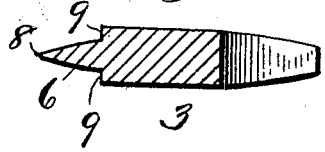
Figure 4:
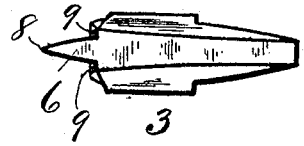

In the drawing:—Figure 1 is a side view of my improved threshing tooth. Fig. 2 is a view showing the working edge of the tooth provided with the sharpened tapering projecting portion or rib. Fig. 3 is a sectional view on the line 3—3 of Fig. 1. Fig. 4 is a lower edge view.

In threshing with teeth presenting a broad working face or edge to the grain, the teeth are liable to carry the grain along in bunches so that the threshing of the kernels is only imperfectly performed, and while threshing teeth have been used which present a tapering or wedge-shape edge to the grain, yet such form of teeth have the disadvantage of not presenting sufficient working surface to the grain to thoroughly thresh the latter and the primary object of my invention is to so construct the tooth that while it will not carry the grain along in bunches, it will at the same time present sufficient surface to effectively thresh the grain and in the drawings 1 indicates my improved tooth, the shank portion 2 of which may be suitably constructed with a view of being attached in any suitable manner to the cylinder or concave of a threshing machine.

The body portion 3 of the tooth tapers from the point where it joins the shank to the edge 4 and the said body portion is provided at its working edge 5 with an integral rib or projecting portion 6 which extends from a point approximately on a line with the beginning of a shank to the edge 4, the lower edge 7 of the said rib being coincident with and forming a continuation of the edge 4. The rib is made tapering or wedge-shape, it being thicker at the point where it joins the body portion of the tooth and tapering outwardly to its working edge 8, which edge is sharpened as seen. The width of the rib where it joins the body portion is somewhat less than the width of the edge 5 so that shoulders 9 are formed on opposite sides of the rib. The rib also tapers from the end adjacent to the shank of the tooth to its opposite end as seen in Fig. 2, and said rib is of less width at its outer end than at its inner end as seen best in Fig. 1.

By making the rib tapering from its inner to its outer end, said outer end which is the first to engage with the grain, will more readily penetrate between the stalks and by reason of the tapering shape said stalks will be gradually forced apart by reason of the tapering shape of the rib and, furthermore, by reason of the shoulders on each side of the rib, the kernels will be threshed from the stalks owing to the action of the said shoulders during the threshing operation, which shoulders present sufficient working surface to accomplish the thorough threshing of the grain.

By reason of the sharpened edge of the rib, the tooth is assisted in entering the grain and prevents the tooth from carrying the latter along in bunches, and this idea of providing the rib with a sharp working edge possesses an advantage over any construction which would not possess a sharpened edge. It will also be noted that by reason of the shoulders on each side of the rib being of the same width from the inner ends of said shoulder to the outer ends thereof, the shoulders provide an efficient working action along their entire length in the threshing operation.

What I claim is:—

A threshing tooth comprising a shank and a body portion, said body portion tapering from its inner end where it joins the shank to the outer end and being provided along its outer edge with a rib which tapers from the point where it joins the body portion to its outer edge, which latter edge is sharpened along its entire length, and said rib also tapering from its inner to its outer end and being of less width than the body of the tooth whereby to form shoulders on opposite sides, and said ribs also being of less width at its outer end than at its inner end.

In testimony whereof I affix my signature in presence of two witnesses.

FRED B. CARLSON.

Witnesses:
G. NORBERLY,
W. M. RANK.